United States Patent [19]

Henbest et al.

[11] 4,268,351

[45] May 19, 1981

[54] MODIFIED UREA FORMALDEHYDE RESIN FIBER PAPER

[76] Inventors: Richard G. C. Henbest; Kenneth McGregor, both of Norton Hall, The Green, Norton, Stockton-on-Tees, Cleveland, England

[21] Appl. No.: 71,570

[22] Filed: Aug. 31, 1979

Related U.S. Application Data

[63] Continuation-in-part of Ser. No. 857,972, Dec. 5, 1977, Pat. No. 4,202,959.

[30] Foreign Application Priority Data

Dec. 8, 1976 [GB] United Kingdom ............... 51199/76

[51] Int. Cl.$^3$ .............................................. D21H 5/12
[52] U.S. Cl. ................................ 162/146; 162/157 R
[58] Field of Search ............... 428/243, 231, 265, 401; 528/254, 231, 261, 265; 264/176 F; 162/146, 157 R

[56] References Cited

U.S. PATENT DOCUMENTS

| | | | |
|---|---|---|---|
| 2,407,599 | 9/1946 | Auten et al. .................... | 260/29.4 R |
| 2,412,855 | 12/1946 | Auten et al. ........................ | 528/254 |
| 2,603,623 | 7/1952 | Bonzagni ............................ | 528/231 |
| 2,863,842 | 12/1958 | Bonzagni ............................ | 528/231 |
| 2,949,396 | 8/1960 | Bonzagni ............................ | 528/254 |
| 3,650,102 | 3/1972 | Economy et al. . | |
| 3,651,199 | 3/1972 | Blume et al. . | |
| 3,661,829 | 5/1972 | Aignesberger et al. ............ | 528/254 |
| 3,848,044 | 5/1975 | Hagiwara et al. . | |
| 3,870,671 | 3/1975 | Aignesberger et al. ............ | 528/254 |
| 3,884,754 | 5/1975 | Kimura et al. .................. | 264/176 F |
| 3,941,734 | 2/1976 | Aignesberger et al. ............ | 528/254 |
| 3,961,123 | 6/1976 | Ohtomo . | |
| 4,067,769 | 1/1978 | Ohtomo et al. .................. | 162/157 R |
| 4,076,692 | 2/1978 | Batha et al. . | |
| 4,088,620 | 5/1978 | Nihongi et al. .................. | 264/176 F |
| 4,138,445 | 2/1979 | Nogi et al. ........................ | 264/176 F |
| 4,145,371 | 3/1979 | Tohyama et al. ............... | 264/176 F |

FOREIGN PATENT DOCUMENTS

| | | | |
|---|---|---|---|
| 48-33763 | 10/1973 | Japan . | |
| 0572962 | 10/1945 | United Kingdom ................ | 162/146 |
| 1141207 | 1/1969 | United Kingdom . | |
| 1420838 | 1/1976 | United Kingdom . | |

OTHER PUBLICATIONS

Chem. Abst., vol. 83, 1975, 165669b, Koyama.
Chem. Abst., vol. 83, 1975, 116741k,, Shiotani et al.
Chem. Abst., vol. 82, 1975, 113089x, 172458g, Nihongi et al.
Chem. Abst., vol. 81, 1974, 14600e, Kohsaka.
Chem. Abst., vol. 85, 1976, 64666j, Nihongi et al.

*Primary Examiner*—Peter Chin

[57] ABSTRACT

A wet laid paper in which at least 1% by weight of the fibrous constituents are UF fibres made from an inorganic oxyacid radical modified UF resin. The inorganic oxyacid radicals are sulphite, phosphate, phosphite, or borate radicals and are present in such an amount that the UF fibres contain 0.2–15 inorganic oxyacid radicals per 100 methylene units. The modified resin is made by reacting urea with formaldehyde in the presence of a source of the oxyacid radicals.

7 Claims, No Drawings

MODIFIED UREA FORMALDEHYDE RESIN FIBER PAPER

This application is a continuation-in-part of our application Ser. No. 857,972 entitled "Resinous Material" filed Dec. 5, 1977 now U.S. Pat. No. 4,202,959.

This invention relates to paper and in particular to paper in which at least part of the fibrous constituents comprises urea-formaldehyde (UF) resin fibres.

Paper is normally wet-laid, by which we mean that it is made by a process in which discontinuous fibres are mixed with water, and any other desired paper making ingredients such as fillers, sizing agents, colorants etc., the mixture is formed into the desired form, e.g. sheet, and then the water is removed.

The strength of paper largely depends on the extent of inter fibre adhesion: with cellulosic fibres the adhesion depends on the nature of the cellulose fibre and can be modified by varying the extent of refining or beating of the cellulose fibres. However unmodified UF resin fibres exert little or no interfibre adhesion. We have found that the strength of UF resin fibre containing papers can be increased by using UF resin fibres formed from a UF resin modified by the incorporation of certain inorganic oxyacid radicals.

According to the present invention we provide a wet-laid paper in which at least 1% by weight of the fibrous constituents comprise UF resin fibres made from a modified UF resin, alone or in admixture with an unmodified UF resin, said modified UF resin being made by reacting urea and formaldehyde in the presence of a source of inorganic oxyacid radicals selected from the group consisting of sulphite, phosphate, phosphite, and borate radicals, the amount of said source being such that there are 0.2 to 15 of said inorganic oxyacid radicals per 100 methylene radicals in said UF fibres.

The inorganic oxyacid radicals are incorporated into the resin by reacting the formaldehyde and urea in the presence of one or more of the corresponding inorganic oxyacids, or one or more salts thereof, particularly one or more acid salts thereof, or a mixture of one or more inorganic oxyacids with one or more salts thereof. The acid or salt employed may be a dehydrated form of the acid or salt giving the specified inorganic oxyacid radicals. Thus sodium metabisulphite may be used, and for the purposes of this invention one molecule thereof is considered to give rise to two sulphite radicals. Likewise one molecule of borax is considered to give rise to four borate radicals.

A suitable proportion of the radicals can be introduced by having present in the mixture of formaldehyde and urea 0.5 to 20%, especially 1 to 10%, by weight of sodium sulphite and/or metabisulphite, based on the weight of the resin solids to be formed from said mixture, or equivalent proportions of inorganic oxyacids and/or salts thereof giving phosphate, phosphite or borate radicals.

Prior to fibre formation sufficient acid, additional if necessary to the source of said inorganic oxyacid radicals is added to the composition as a catalyst to promote curing. For example, 0.2 to 5.0% w/w of formic acid or its equivalent is suitable; ammonium salts of phosphoric, sulphuric or formic acid, and aluminium sulphate, are also suitable catalyst.

Normally the curing catalysts are added to the resin after reaction of the urea with the formaldehyde. It should be noted that addition of such a catalyst, e.g. phosphoric acid or an ammonium salt thereof, that is a source of one or more of the specified oxyacid radicals after reaction of the urea and formaldehyde is not effective in increasing the adhesion of UF resin fibres: presumably inorganic oxyacid radicals added at that stage are not incorporated into the resin whereas, if present during the reaction of the urea with the formaldehyde, do become incorporated into the resin.

The fibres may be made from a mixture of the inorganic oxyacid radical modified UF resin and an unmodified UF resin. However in such a mixture the modified resin should contain sufficient of the inorganic oxyacid radicals that the resultant mixture, and hence the fibres produced therefrom, contain 0.2 to 15 inorganic oxyacid radicals per 100 methylene units.

The resin, while in a flowable condition, is formed into fibres. This can be suitably done by conventional spinning of a viscous resin syrup into hot air ("dry-spinning") or into an acid bath ("wet-spinning"). Alternatively it can be formed by passing a fine stream or series of drops into a flowing resin-gelling liquid or by gas-fibrillation (in particular air-fibrillation) by means of a co-current or transverse gas stream.

In the gas fibrillation process a continuous stream of liquid resin (such as a syrup containing 50-80% w/w of solids in water) is directed into the path of transversely-flowing or cocurrently-flowing gas. The gas may issue from a nozzle in the throat of which its velocity may be as high as sonic velocity. The gas flow is preferably about perpendicular to the resin flow. Suitably the gas is air. By way of example, if the resin stream in the zone of gas impingement is 0.1 to 2.0 mm in diameter and the resin viscosity is 5-100 (preferably 10-50) poise, the thread splits into fine fibres of diameter in the range 2-30 microns. The nozzle should be as close to the resin stream as possible in order to maximise conversion to fibre. The fibre thickness is less the greater the air supply pressure and flow rate. Above a certain pressure, for given resin characteristics and stream diameter, the fibres become not thinner but shorter. A suitable resin flow rate is 5-30 g/min with an air flow rate of 100-600 SCFH at air pressures of 10-80 psig. The air nozzle can be circular, rectangular, or of any shape that impinges upon the resin stream in a stable manner. It has been found that good quality fibre with the minimum amount of shot results if the resin stream flows steadily and without breaking. A plurality of resin streams can be directed into a single gas flow.

As a further alternative the resin can be spun by tack-spinning, by pulling the resin into fibres between two surfaces to which it adheres and subsequently severing the fibres from one or both of the surfaces. For example, as described in U.K. Pat. No. 1,141,207, the resin may be moved into contact with a pair of belt surfaces so as to deposit it therebetween, whereafter the surfaces of the belts are moved apart to form fibres and stretch them, and the fibres are detached and collected. In another tack-spinning process the resin is interposed between a porous surface and a second surface, the surfaces are caused to diverge so as to string fibres between them, the fibres are stabilised or solidified at least in part by fluid directed into or through the fibre-forming area from the opposite side of the porous surface to that on which the fibres are formed, and the fibres are separated at least from the second surface.

After formation, the fibres are normally fully cured by heating at between 100° C. and 200° C. It is, however, within the scope of the invention to effect a partial cure at this stage.

The fibres are particularly suitable for paper making when their average diameter does not exceed 25 microns (1 micron is usually the smallest practical diameter) and their average length is at least 1 mm, preferably over 2.5 mm. Generally it is not practical to use fibres having a length in excess of 6 mm to make paper by the wet laid process. Thus the UF resin fibres preferably have an average diameter between 1 and 25 microns and a length of less than 6 mm and an average length of at least 1 mm. The UF resin fibres can be the sole fibrous component of the paper or can be blended with other fibres such as UF resin fibres containing no inorganic oxyacid radicals, cellulose fibres such as conventional paper pulp and/or rag stock, other synthetic polymer fibres, and inorganic fibres. The paper should however contain at least 1% by weight of the inorganic oxyacid radical containing UF resin fibres. The fibres made from the inorganic oxyacid radical modified UF resins adhere well to one another and also to other paper-making fibres. This makes possible a gradation of paper properties, from the low stiffness, high bulk papers when little inorganic oxyacid radical containing fibre is present, to stiff papers. A particularly useful paper contains 10–30% w/w of long fibres (over 2 mm) made from inorganic oxyacid containing UF resin with short-fibre (under 2 mm) mechanical cellulose pulp and optionally 5 to 20% w/w of oxyacid-free UF resin fibre. When the paper contains cellulose fibre and 5 to 50% w/w or inorganic oxyacid radical containing UF resin fibres, its water-resistance (in the sense of wet-strength or, depending on its composition, resistance to wetting) is usefully greater than that of a corresponding all-cellulose paper.

Paper according to the invention can contain conventional fillers, sizing agents, colouring matters and can carry the usual coatings and be laminated with other sheet materials. Preferably such paper contains one or more multivalent cations for example of iron, zirconium, calcium or (especially) aluminium, at a concentration equivalent to 0.5 to 5.0% w/w of aluminium sulphate on the fibres. Such cations are conveniently introduced as soluble salts in the paper-making pulp. Generally it appears that less sizing agent is needed than in all-cellulose papers.

The papers are made by mixing the fibres with water and any other ingredients as set out hereinbefore to form a slurry, bringing the mixture to a sufficiently homogeneous state for the grade of paper to be produced, forming the mixture into the shape required and removing water from the shape. The mixing, homogenisation and water-removal can be carried out in machinery as used for dealing with cellulose pulp. The paper shapes are normally heated at over 60° C. to remove water, and their cohesion can be improved, especially when an inorganic multivalent cation such as aluminium is present, by heating at over 90° C., for example 110°–140° C. If the paper is in sheet form, such heating can be carried out using the usual steam-heated calender rolls. The adhesion obtained between the fibres will often be improved by ensuring a good degree of compaction of the paper sheet, eg by rolling at the wet stage.

The invention is illustrated by the following examples in which all parts and percentages are expressed by weight.

EXAMPLE 1 (Comparative)

Fibre formation by transverse air fibrillation

A UF resin, of F:U molar ratio 1.95 and solids content about 67% was adjusted to a viscosity of 22 poise at 23° C. by adding water and 2.5 g of a 40% solution of diammonium hydrogen phosphate, as a curing agent, for every 200 g of resin. The final solids content was about 61%. This was forced by air pressure downwards through an orifice at a rate of 21 g/min and blown by a horizontal air jet from a rectangular nozzle (dimensions 1 mm × 8 mm), using an air pressure of 50 psig and a flow rate of 500 SCFH. This produced a fine fibre which was blown into a chamber heated to 50° C. The fibre was collected, further dried at 60° C. and cured by heating at 120° C. When dispersed and disintegrated in water as for paper-making, the fibres were 1–2 mm long and about 10 microns in mean diameter.

Paper preparation

The UF resin fibre was disintegrated in a standard manner using 2000 counter revolutions of a standard laboratory pulp disintegrator, then converted to paper of substance 100 g/m$^2$ on a standard pulp evaluation apparatus.

The paper could just be removed from the wire screen of the apparatus but fell apart on drying, indicating that paper made wholly from unmodified UF resin fibres had poor adhesion.

EXAMPLE 2

Resin preparation 3267 ml of formalin (36.5% HCHO, 6.5% CH$_3$OH) was adjusted to pH 7.2 with NaOH solution, and 1303 g of urea, 20 g of Na$_2$SO$_3$.7H$_2$O and 186 g Na$_2$S$_2$O$_5$ were added (pH was then 9.1). The mixture was refluxed for 30 minutes, cooled to 70° C., acidified with formic acid to pH 4.8, and returned to reflux for one hour. It was brought to pH 5.8 by adding NaOH, cooled to 50° C., and finally adjusted to 7.25 by the addition of further NaOH. The mixture was concentrated by vacuum evaporation to give a resin solution of viscosity 21 poise at 29° C., and solids content about 75%. The resin contained about 4.7 sulphite radicals per 100 methylene units. The resin was fibrillated and made into paper by the method described in Example 1. The paper could be handled more easily than that of Example 1 and, when dried on a heated drum at 120° C., cohered well together.

EXAMPLE 3

Results similar to those of Example 2 were obtained when paper was made from fibres produced by the method of Example 1 using a blend of equal amounts of the unmodified UF resin used in Example 1 and the sulphite modified resin used in Example 2. The fibres thus contained about 2.35 sulphite radicals per 100 methylene units. Paper was also made from fibre made from the blend of resins with the addition in the paper-making mixture, 2% of Al$_2$(SO$_4$)$_3$ based on the weight of fibre. This formed well on the wire, and was dried initially by pressing between absorbent sheets, and finally in an oven at 90° C. When tested it showed a burst index of 0.40 kNg$^{-1}$ (burst pressure in kNm$^{-2}$ divided by the substance in g m$^{-2}$).

EXAMPLE 4

A mixture of equal amounts of the sulphite modified resin fibres of Example 2 and a bleached Kraft pulp beaten to a Canadian Standard Freeness of about 400 ml was formed into a series of papers; in some of the samples 2% of $Al_2(SO_4)_3$ (based on the weight of fibre) was added during disintegration of the pulp. Strong, stiff papers were obtained after drying. Those with $Al_2(SO_4)_3$ added were particularly stiff, especially when dried at 120° C.

The papers were not readily wetted by water, whereas papers prepared from the Kraft pulp alone absorbed a drop of water placed on the surface almost immediately.

When the sulphite modified UF resin fibres were replaced by the unmodified fibres of Example 1, the papers were limp and lost fibre easily when the surface was rubbed.

EXAMPLE 5

A sulphite modified resin was prepared using the components described in Example 2. The acidic condensation stage was performed at a pH of 4.8 for 48 minutes and the final pH was 7.2. After vacuum concentration a resin of approximate solids content 80% and viscosity 45 poise at 23° C. was obtained.

A blend of equal parts of this resin with the UF resin used in Example 1 was fibrillated using the procedure of Example 1. Incorporated into the resin mixture before spinning was 1.25% of an aqueous solution of a catalyst. The catalyst solution, and the curing schedule after spinnng, was varied as follows:

(i) catalyst: 40% diammonium hydrogen phosphate; curing time: 4 hours at 120° C.
(ii) catalyst: 40% aluminium sulphate; curing time: 1 hour at 120° C.
(iii) catalyst: 40% formic acid; curing time: 7 hours at 120° C.

The fibres so produced were of mean diameter 10 $\mu$m. They were broken down by using a laboratory disintegrator to a length of about 2 mm, and incorporated into papers (a) alone and (b) in admixture with a mechanically ground wood pulp, using the standard procedure for making and testing paper hand sheets. Aluminium sulphate (2% on the fibre) was added. Burst indices were measured on the papers, which had a substance of about 60 g/m$^2$

| Catalyst/Cure | Mechanical Pulp | | | |
|---|---|---|---|---|
| | 0 | 50 | 80 | |
| (i) | 0.28 | 0.56 | 0.92 | Burst index $kN^{-1}$ |
| (ii) | 0.17 | 0.75 | 0.88 | |
| (iii) | 0.12 | 0.38 | 0.67 | |

As a comparison, sheets of paper were made using fibres produced from the sulphite-free resin of Example 1 and the mechanical wood pulp. Burst indices were as follows:

| % Mechanical Pulp | Burst Index kNg$^{-1}$ |
|---|---|
| 50 | 0.35 |
| 80 | 0.63 |
| 100 | 0.82 |

The examples show the superiority of the sulphite containing fibres over unmodified UF fibres, and that the fibres can be used to improve the burst index of mechanical pulp.

EXAMPLE 6

Example 5 was repeated using different proportions of the sulphite modified and the unmodified resins. The blends were adjusted to a viscosity of 30 poise and spun into fibre using the procedure of Example 1 except that the catalyst solution (a 40% solution in water of diammonium hydrogen phosphate) was added continuously, the discharge rate was 12 g/min and the air pressure was 30 psig (air rate 300 SCFH). Fibres of mean diameter 10 $\mu$m were produced. Papers were made as before from the fibres and from mixtures of the fibres with mechanical pulp. Aluminium sulphate, 2% on the fibres, was added. The fibres and the properties of the papers are described below.

| UF Resin | | | | | Paper properties | |
|---|---|---|---|---|---|---|
| Amount of constituent resins | | Amount of $SO_3''$ radicals | | | 50% UF | 20% UF |
| Sulphite modified (parts) | Unmodified (parts) | wt % + | No per 100 —$CH_2$— radicals | 100% UF adhesion | 50% mechanical Burst Index (kNg$^{-1}$) | 80% mechanical Burst Index (kNg$^{-1}$) |
| 5 | 95 | 0.5 | 0.3 | Soft | — | 0.69 |
| 15 | 85 | 1.5 | 0.8 | Soft | — | 0.67 |
| 25 | 75 | 2.5 | 1.3 | Soft | 0.41 | 0.7 |
| 35 | 65 | 3.5 | 1.8 | Firm | 0.47 | 0.79 |
| *50 | 50 | 4.9 | 2.6 | — | 0.56 | 0.92 |

*paper made from fiber (i) in Example 5.
+ on resin solids

EXAMPLE 7

The resin mixture of Example 5, was adjusted in viscosity to 35 poise. Fibres were prepared from this material by centrifugal spinning as described in Snowden U.S. Ser. No. 885,344. (Detailed conditions: 3" rotor, speed 4,500 rpm, flow rate of resin 60 ml/min, temperature of surrounding air 75° C.). Catalyst (1.25% of 40% diammonium sulphate) was fed into the resin, and mixed, via a static mixer, continuously as the resin was supplied to the spinning disc. Long fibres of diameter 12 $\mu$m (average) were produced. These were cured by heating at 120° C. for four hours, and broken to lengths less than 5 mm before use.

Paper hand sheets were prepared from the fibres incorporating with the disintegrated fibres in water various metallic salts (all at a level of 2% based on the amount of fibre). The papers were well compacted while wet, pressed according to the British standard procedure, and dried at 70° C. Burst indices were measured as follows:

| Added Salt | Burst Index (kNg$^{-1}$) |
|---|---|
| $Al_2(SO_4)_3$ | 0.56 |
| Calcium formate | 0.28 |
| Ferric sulphate | 0.46 |
| Zinc nitrate | 0.27 |

EXAMPLE 8

Example 7 was repeated using a mixture of a conventional UF resin of solids content 67% and F:U molar ratio 1.7:1 and a resin prepared using the components of Example 2 with the acidic condensation stage performed at pH 4.9 for 38 minutes followed by urea (208 parts) addition to bring the final F:U molar ratio to 1.72:1. The catalyst used was 6% of a 30% solution of diammonium hydrogen phosphate. The fibres produced were similar to those of Example 7 and reduced to less than 6 mm in length after curing at 120° C. for 4 hours.

Some of the fibres were made into paper as described previously (Example 7) to yield a paper with a burst index of 0.51 $kNg^{-1}$. The paper had considerable strength when wetted by water; a burst index of 0.15 $kNg^{-1}$ was measured on the wet paper.

A blend of fibres with an equal amount of mechanical pulp gave a paper with a burst index of 0.85 $kNg^{-1}$.

Blends of the fibre with Kraft pulp were compared, as paper hand sheets, with blends using unmodified UF fibres similarly produced.

Measured burst indices were as follows.

| Paper | Burst Index ($kNg^{-1}$) |
| --- | --- |
| 80% Kraft, 20% unmodified UF fibers | 3.36 |
| 90% Kraft, 10% unmodified UF fibers | 4.49 |
| 80% Kraft, 20% modified UF fibers | 4.04 |
| 90% Kraft, 10% modified UF fibers | 5.03 |

In a further experiment to illustrate the use of the fibres of the present invention, a paper was prepared using 30% of modified UF fibres, as prepared above, 20% of unmodified UF fibres, as used in the above experiment, and 50% groundwood pulp. An excellent paper sample of burst index 0.68 $kNg^{-1}$ was obtained.

EXAMPLE 9

650 parts of formalin (36.4% formaldehyde, 5.7% methanol, acidity 0.016%) were mixed with 237 parts of urea (formaldehyde: urea molar ratio 2:1) and brough to pH 7 with caustic soda solution. 11.6 parts of $NaH_2PO_4.2H_2O$ were added and the mixture heated to 55° C., when further NaOH solution was added to bring the pH to 6.05. The mixture was refluxed for 30 minutes, acidified to pH 4.9 with formic acid solution and refluxed further for 50 minutes. The pH was then adjusted to 5.4 with caustic soda solution, cooled to 40° C. and neutralised to pH 7 with more NaOH solution. The resin was concentrated by heating under vacuum to remove 285 parts of distillate. The resin contained about 0.94 phosphate radicals per 100 methylene radicals.

The resin was converted to fibres by using the centrifugal spinning technique described in Example 7, except that in this case the catalyst used was a 30% solution of phosphoric acid. The fibres were cured at 120° C. for 4 hours.

Paper handsheets were prepared as before from the disintegrated fibre (fibre length about 5 mm, diameter 12 $\mu$m), and from mixtures of the fibre with groundwood pulp. The burst indices of the paper samples were as follows:

| % Groundwood | Burst Index ($kNg^{-1}$) |
| --- | --- |
| 0 | 0.20 |
| 40 | 0.45 |
| 90 | 0.90 |

The fibres showed good self-adhesive properties.

EXAMPLE 10

650 parts of formalin and 237 parts of urea, as used in the previous example, were mixed with 16.0 parts of $Na_2HPO_3.5H_2O$ and refluxed for 30 minutes. Formic acid was added to reduce the pH to 4.85 and the mixture was further refluxed for 44 minutes. Caustic soda was then added to change the pH to 5.45, the resin was cooled to 50° C. and adjusted to pH 6.95. The resin was concentrated under vacuum, removing 355 parts of distillate. The resin contained about 0.94 phosphite radicals per 100 methylene radicals.

A blend of equal parts of this resin with a conventional UF resin (Formaldehyde: urea molar ratio 1.95:1) was centrifugally spun as described in Example 7. Fibres as produced were of mean diameter 12 $\mu$m after curing for 4 hours at 120° C. After reducing in length to about 4 mm, papers were prepared, as before, and demonstrated that the fibres showed the property of self-adhesion. Mixtures of the fibres with groundwood gave papers with the following properties.

| % Groundwood | Burst Index ($kNg^{-1}$) |
| --- | --- |
| 50 | 0.57 |
| 80 | 0.78 |
| 90 | 0.87 |

EXAMPLE 11

650 parts of formalin, and 237 parts of urea, as used in Example 10, were mixed and warmed to 40° C. 2.3 parts of $H_3BO_3$ and 14.2 parts of $Na_2B_4O_7.10H_2O$ were dissolved in the mixture which was then refluxed for 30 minutes (pH 8.05). Formic acid was added to bring the pH to 4.85 and the mixture refluxed for a further 43 minutes. Caustic soda solution was added to achieve a pH of 5.6, the solution was cooled to 50° C. and finally adjusted (with caustic soda solution) to pH 7.0. The resin was concentrated under vacuum to remove 345 parts of distillate. The resin contained about 2.4 borate radicals per 100 methylene units.

Fibres were centrifugally spun as in Example 7. The catalyst solution used was 30% phosphoric acid. The fibres were cured at 120° C. for an hour and shortened to a length of about 3 mm. Papers were made as in Example 10. A paper containing 100% borate modified UF fibre was easily formed and showed good self-adhesion. Papers containing groundwood pulp had the following burst indices.

| % Groundwood | % Borate modified fiber | Burst Index ($kNg^{-1}$) |
| --- | --- | --- |
| 50 | 50 | 0.75 |
| 80 | 20 | 0.85 |
| 90 | 10 | 0.89 |

We claim:

1. A wet-laid paper in which at least 1% by weight of the fibrous constituents comprise urea-formaldehyde resin fibres made from a modified urea-formaldehyde resin, alone or in admixture with an unmodified urea-formaldehyde resin, said modified urea-formaldehyde resin being made by reacting urea and formaldehyde in the presence of a source of inorganic oxyacid radicals selected from the group consisting of sulphite, phosphate, phosphite, and borate radicals, the amount of said source being such that there are 0.2 to 15 of said inorganic oxyacid radicals per 100 methylene radicals in said urea-formaldehyde resin fibres.

2. A wet-laid paper according to claim 1 wherein the urea-formaldehyde resin fibres have an average diameter of between 1 and 25 μm.

3. A wet-laid paper according to claim 1 wherein the urea-formaldehyde resin fibres have a length of less than 6 mm and an average length of at least 1 mm.

4. A wet-laid paper according to claim 1 wherein the modified urea-formaldehyde resin is made by reacting the urea and formaldehyde in the presence of 0.5 to 20% by weight, based on the weight of the resin solids formed from said urea and formaldehyde, of a compound selected from at least one of sodium sulphite and sodium metabisulphite.

5. A wet-laid paper according to claim 1 wherein the fibrous constituents comprise cellulose fibre in admixture with 5 to 50% by weight, based on the weight of said fibrous constituents, of the inorganic oxyacid radical containing urea-formaldehyde resin fibres.

6. A method of making paper comprising forming a mixture of discontinuous fibres with water, forming the mixture into sheet form and removing the water, wherein at least 1% by weight of the fibres are urea-formaldehyde resin fibres made from a modified urea-formaldehyde resin, alone or in admixture with an unmodified urea-formaldehyde resin, said modified urea-formaldehyde resin being made by reacting urea and formaldehyde in the presence of a source of inorganic oxyacid radicals selected from the group consisting of sulphite, phosphate, phosphite, and borate radicals, the amount of said source being such that there are 0.2 to 15 inorganic oxyacid radicals per 100 methylene radicals in said urea-formaldehyde resin fibres.

7. A method of making paper comprising
(a) forming a modified urea-formaldehyde resin by reacting urea and formaldehyde in the presence of a source of inorganic oxyacid radicals selected from the group consisting of sulphite, phosphate, phosphite, and borate radicals,
(b) forming said modified urea-formaldehyde resin, alone or in admixture with an unmodified urea-formaldehyde resin, into discontinuous inorganic oxyacid radical containing fibres having an average length of at least 1 mm and an average diameter between 1 and 25 μm,
the amount of said source of inorganic oxyacid radicals being such that said urea-formaldehyde resin fibres contain 0.2 to 15 of said inorganic oxyacid radicals per 100 methylene units,
(c) mixing said inorganic oxyacid radical containing fibres with water and optionally other discontinuous paper making fibres to form a slurry so that the inorganic oxyacid radical containing fibres constitute at least 1% by weight of the fibrous material in said slurry,
(d) forming said slurry into sheet form, and
(e) removing the water therefrom.

* * * * *